ELECTRONIC RELAY

Filed Jan. 25, 1960

*INVENTORS*
LAWRENCE M. CARVER
HERBERT LEVICK 3,170,037

ELECTRONIC RELAY

Lawrence M. Carver, Springdale, and Herbert Levick, Wilton, Conn., assignors to Stelma, Incorporated, Stamford, Conn., a corporation of Connecticut Filed Jan. 25, 1960, Ser. No. 4,580
15 Claims. (Cl. 178—70)

This invention relates to apparatus for converting neutral telegraph signals to polar signals. More particularly, it relates to electronic relays suitable for telegraph or data transmission use where a neutral (on-off) input is converted into a polar (reversal of polarity) output signal.

The primary object of the present invention is to provide an electronic neutral to polar relay.

Another object of the invention is to provide a neutral to polar electronic relay wherein relatively high keying speeds may be secured with low distortions in signals.

A further object of the invention is to provide a non-mechanical neutral to polar relay with life expectancy beyond that of relays having moving parts.

Still another object of the invention is to provide an electronic neutral to polar relay whose actuation time is only microseconds in length.

Yet another object of the invention is to provide a sensitive electronic neutral to polar relay which is extremely resistant to random mechanical stress and shock.

A still further object of the invention is to provide a neutral to polar electronic relay of improved reliability.

Further objects, features and advantages of the present invention will appear from the following description and the accompanying drawings.

Figure 1:
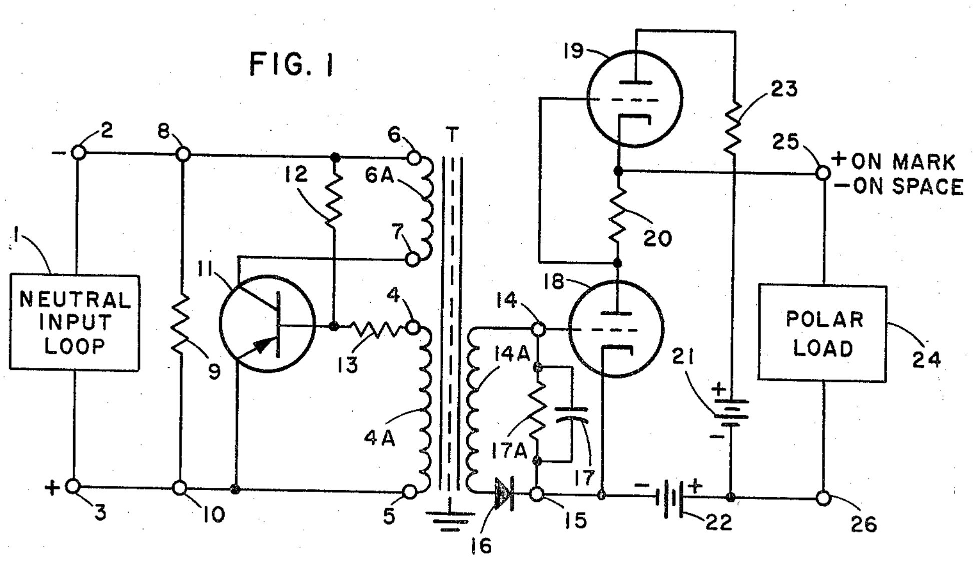
FIGURE 1 shows a first embodiment of the invention.

In FIGURE 1, transistor 11 represents an oscillator which is excited by the telegraph loop current to oscillate on mark conditions communicated by neutral input loop 1. Coupling between windings 4A and 6A of transformer T provides feedback necessary to maintain oscillation in a range, of 5–100 kc. Voltage drop across resistor 9, due to the loop current, excites the oscillator circuit of transistor 11. Resistors 12 and 13 establish the base potential for proper operation of the transistor. Secondary winding 14A of transformer T supplies output to rectifier 16. Capacitor 17 in the output of rectifier 16 filters out ripple in the oscillator input signal. Resistor 17A serves as a load resistor for rectifier 16 and as a grid resistor for keying tube 18. The D.C. voltage across resistor 17A may, in this type of circuit, be of the order of minus 30 volts, for mark, and zero volts for space (no current) input to tube 18.

Polar keying action from tubes 18 and 19 is secured in the following manner. With mark input to transistor 11, the negative voltage at the grid of tube 18 prevents conduction in this tube. Under these conditions, tube 19 conducts since its grid returns to its cathode through resistor 20 and negligible current flows through this resistor. Terminal 25 will now be positive, returning to the positive terminal of D.C. source 21 through tube 19. Output terminal 26 returns directly to the negative terminal of D.C. source 21.

When space condition exists on the input loop, transistor 11 ceases oscillation and the grid of tube 18 returns to the cathode through resistor 17A. Rectifier 16 produces no output. Tube 18 now conducts heavily, producing a voltage drop across resistor 20, which in turn biases off tube 19, since the grid of tube 19 will now be 30 volts negative with respect to its cathode for a 30 ma. polar loop. Output terminal 25 will now be connected to the negative battery terminal of D.C. source 22 via resistor 20 and tube 18, while output terminal 26 connects directly to the positive terminal of D.C. source 22.

Thus, alternate mark-space neutral signals across input resistor 9 will produce alternate mark-space polar signals at output terminals 25 and 26 across polar output load 24.

Figure 2:
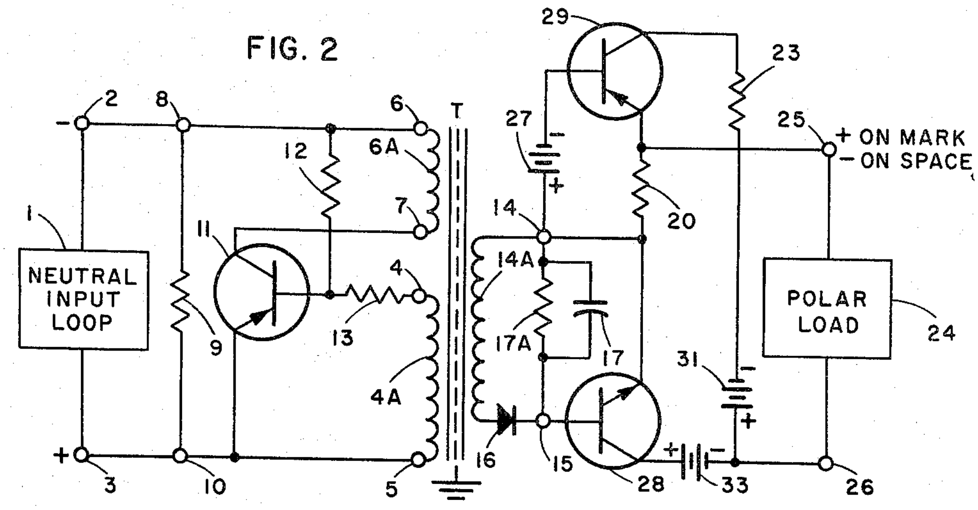
FIGURE 2 shows a second embodiment of the invention.

FIGURE 2 illustrates a circuit utilizing transistors for polar keying. The input loop including transistor 11 operates as explained above. Transistor 28 is activated to conduct on mark by positive output from rectifier 16. This connects the positive terminal of D.C. source 33 to polar output terminal 25 through transistor 28 and resistor 20. The voltage drop across resistor 20 is applied in opposition to the voltage of D.C. source 27, to the base of transistor 29, keeping it cut off in a non-conducting state.

On space input, the positive drive to the base of transistor 28 is removed so that transistor 28 does not conduct to draw current through resistor 20. Voltage of D.C. source 27 causes conduction in transistor 29; and negative voltage from D.C. source 31 is applied via transistor 29 to polar output terminal 25. Polar output is thus secured for a neutral input to the device of FIGURE 2.

Resistor 23 in both FIGURES 1 and 2 allows mark and space currents to be balanced; resistor 23 may be made variable for exact balancing of mark and space output currents, if desired.

It will be seen that devices according to the invention provide polar output without the expense, and complex and critical adjustment of components hitherto necessary to obtain relatively distortionless output. The invention further provides a neutral to polar electronic relay having reliability and life expectancy exceeding those of mechanical relays, and capable of sustained operation in the most extreme physical environments. The invention further enables relatively distortionless polar output to be obtained directly without the use of such output elements as may introduce undue output frequency distortion and undesirable signal time-displacements.

While certain embodiments of the present invention have been described hereinabove, it will be understood that the concepts of the invention may be applied, varied or modified within the scope of the appended claims.

We claim:

1. A non-mechanical relay comprising first neutral input means for receiving marking current, a second means for transmitting signals related to said marking current, coupling and D.C. current isolating means having input means and output means for electrically connecting said first and second means, oscillator means for connecting said oscillator means to said input means, means connected in said first means, amplifying and rectifier means in said second means to produce polar output signals corresponding to said marking current by producing a positive polarity signal on a mark condition and a negative polarity signal on a no mark condition and means for connecting said output means to said amplifying and rectifier means.

2. An electronic relay for coupling an input loop to an output loop comprising electronic oscillator means connected to said input loop and adapted to be actuated by input loop current, electromagnetic A.C. coupling means connected to said oscillator means, D.C. restoring rectifier means connected to said electromagnetic A.C. coupling means, and electronic polar keying means connected to said D.C. restoring rectifier means, said electromagnetic A.C. coupling means adapted to transfer A.C. signals from said oscillator means to said D.C. restoring rectifier means, said D.C. restoring rectifier means energizing said electronic polar keying means, in response to said A.C. signal whereby said input signals are connected into polar signals.

3. A telegraph relay for feeding a polar loop from a neutral loop, which receives telegraph signals having marking and spacing intervals, comprising an oscillator coupled to the neutral loop and operable to generate an alternating current signal during marking intervals of telegraph signals, rectifier means for connecting alternating current signals to direct current signals, polar keying means, means coupling said oscillator to said rectifier and means coupling said rectifier to said polar keying means, whereby a polar output is transmitted from said polar keying means which is representative of the marking and spacing intervals of said telegraph signals, received by said oscillator.

4. A telegraph relay for feeding a polar loop from a neutral loop which receives telegraph signals having marking and spacing intervals, comprising an oscillator coupled to the neutral loop and operable to generate an alternating current signal during marking intervals of telegraph signals, rectifier means for connecting alternating current signals to direct current signals, polar keying means operable by direct current signals, transformer means coupling said oscillator to said rectifier and means for connecting said rectifier to said polar keying means, whereby a polar output is transmitted from said polar keying means which is representative of the marking and spacing intervals of said telegraph signal, the primary of said transformer constituting inductance in said oscillator, and the secondary of said transformer constituting the input to said rectifier.

5. A neutral to polar telegraph relay comprising an oscillator having an output means and an input means and connected to a neutral loop, rectifier means, polar keying means connected to said rectifier means, and means coupling the output means of said oscillator to said rectifier means and to the input means of said oscillator whereby to provide D.C. current isolation between said oscillator and rectifier means.

6. A neutral to polar electronic relay for connecting a neutral input loop to a polar output loop, comprising, oscillator means having means connected to said neutral loop for receiving neutral input signals, coupling means connected between said loops, polar keying means in said polar loops, and rectifier means connected between said coupling means and said polar keying means, said polar keying means including first and second electronic circuit mean driven by said rectifier means and an electrical impedance connected to said first and second electronic circuit means wherein current drawn by said first electronic circuit means will cause a voltage drop across said electrical impedance to deactivate said second electronic circuit means and produce one output polarity and deactivation of said first electronic circuit means will remove the voltage drop across said electrical impedance to activate said second electronic circuit, means to produce an output of the opposite polarity.

7. A neutral to polar electronic relay comprising a neutral input loop, a polar output loop, oscillator means having means connected to said neutral loop for receiving neutral input signals, coupling means connected between said loops, polar keying means in said polar loop, and rectifier means connected between said coupling means and said polar keying means, said polar keying means including comprising first and second electronic circuit means driven by the said rectifier means and an electrical impedance wherein electrical current drawn by said first electronic circuit means causes a voltage drop across said impedance to bias off said second electronic circuit means and produce one output polarity and non-conduction of said first electronic circuit means will remove the voltage drop across said electrical impedance and allow conduction of said second electronic circuit means to produce an output of the opposite polarity, said coupling means comprising transformer means having primary and secondary windings and filter means being disposed between said secondary windings and said first and second electronic circuit means.

8. A device for converting neutral input signals to polar signals comprising an oscillator having input means for receiving said neutral input signals and output means for transmitting signals when said neutral input signals are in a selected state, means for generating first and second voltages, output circuit means, first and second gating circuit means connected between said generating means and said output circuit means, means for coupling the output means of said oscillator to said first gating means, said first gating means being open in response to the output from said coupling means, means for closing said second gating circuit means when said first gating circuit means is open and means for opening said second gating circuit means when said first gating circuit means is closed whereby said first and second voltages may be selectively applied to said output circuit means in order to define said polar signals.

9. An input circuit for converting neutral "Mark-Space" signals to polar signals comprising means operable to produce a voltage indication whenever the incoming neutral signal is in a "mark" condition, first transfer means, a positive voltage source connected to said first transfer means, second transfer means, a negative voltage source connected to said second transfer means, an output circuit, each of said transfer means being adapted when energized to apply its connected voltage source to said output circuit, means for coupling the output of said first named means to said first transfer means, means connected to and responsive to said coupling means for energizing said first transfer means and simultaneously deenergizing said second transfer means whenever a "mark" appears in said incoming signal, and means connected to said coupling means for deenergizing said first transfer means and simultaneously energizing said second transfer means whenever a "space" appears in said incoming signal whereby a polar representation of said neutral signal may be transmitted to said output circuit.

10. An electronic circuit for converting a signal characterized by the presence or absence of current in a two terminal loop to a signal characterized by the polarity of current comprising a first signal amplifying means having input, output and reference terminals, a transformer having first, second and third windings, a first resistor connected across the terminals of said two terminal loop, means for connecting said first winding between the output terminal of said first signal amplifying means and one terminal of said two terminal loop, means for connecting one end of said second winding to said other terminal of said two terminal loop and to the reference terminal of said first signal amplifying means, means for connecting the other end of said second winding to the input terminal of said first signal amplifying means, a unidirectional current carrying device having first and second terminals, means for connecting one terminal of said unidirectional current carrying device to one end of said third winding, a second resistor connecting the other end of said third winding to the other terminal of said unidirectional current carrying device, a capacitor connected in parallel with said second resistor, second and third signal amplifying means each having input, output and cathode terminals, means for connecting the input terminal of said second signal amplifying means to said other end of said third winding, an impedance connecting the output terminal of said second signal amplifying means to the cathode terminal of of said third signal amplifying means, means connecting the output terminal of said second signal amplifying means to the input terminal of said third signal amplifying means, means for connecting the cathode terminal of said second signal amplifying means to said other terminal of said unidirectional current carrying device, a source of potential having first, second and third terminals at different voltages wherein said second terminal is at a voltage intermediate the voltages of said first and second terminals, means for connecting the first terminal of said source of potential to the cathode terminal of said second signal amplifying means, a fourth resistor connecting the third terminal of said source of potential to the output terminal of said third signal amplifying means and means for connecting a load between the second terminal of said source of potential and the cathode terminal of said second signal amplifying means.

11. An electronic circuit for converting a signal characterized by the presence or absence of current in a two terminal loop to a signal characterized by the polarity of current comprising a signal amplifying means having input, output and cathode terminals, a transformer having first, second and third windings, a first resistor connected across the terminals of said two terminal loop, means for connecting said first winding between the output terminal of said signal amplifying means and one terminal of said two terminal loop, means for connecting said second winding to said other terminal of said two terminal loop and to the reference terminal of said signal amplifying means, means for connecting the other end of said second winding to the input terminal of said signal amplifying means, a rectifier having first and second terminals, means for connecting one terminal of said rectifier to one end of said third winding, a second resistor connecting the other end of said third winding to the other terminal of said rectifier, a capacitor connected in parallel with said second resistor, first and second vacuum tubes each having an anode, a control grid and a cathode, means for connecting the control grid of said first vacuum tube to said other end of said third winding, a third resistor connecting the anode of said first vacuum tube to the cathode of said second vacuum tube, means connecting the anode of said first vacuum tube to the control grid of said second vacuum tube, means for connecting the cathode of said first vacuum tube to said other terminal of said rectifier, a source of potential having first, second and third terminals at different voltages wherein said second terminal is at a voltage intermediate the voltages of said first and second terminals, means for connecting the first terminal of said source of potential to the cathode of said first vacuum tube, a fourth resistor connecting the third terminal of said source of potential to the anode of said second vacuum tube and means for connecting a load between the second terminal of said source of potential and the cathode of said second vacuum tube.

12. An electronic circuit for converting a signal characterized by the presence or absence of current in a two terminal loop to a signal characterized by the polarity of current comprising a transistor having an emitter, a collector and a base, a transformer having first, second and third windings, a first resistor connected across the terminals of said two terminal loop, means for connecting said first winding between the collector of said transistor and one terminal of said two terminal loop, means for connecting one end of said second winding to said other terminal of said two terminal loop and to the emitter of said transistor, resistance means for connecting the other end of said second winding to the base of said transistor and the first terminal of said two terminal loop, a rectifier having first and second terminals, means for connecting one terminal of said rectifier to one end of said third winding, a second resistor connecting the other end of said third winding to the other terminal of said rectifier, a capacitor connected in parallel with said second resistor, first and second vacuum tubes each having an anode, a control grid and a cathode, means for connecting the control grid of said first vacuum tube to said other end of said third winding, a third resistor connecting the anode of said first vacuum tube to the cathode of said second vacuum tube, means connecting the anode of said first vacuum tube to the control grid of said second vacuum tube, means for connecting the cathode of said first vacuum tube to said other terminal of said rectifier, a source of potential having first, second and third terminals at different voltages wherein said second terminal is at a voltage intermediate the voltages of said first and second terminals, means for connecting the first terminal of said source of potential to the cathode of said first vacuum tube, a fourth resistor connecting the third terminal of said source of potential to the anode of said second vacuum tube and means for connecting a load between the second terminal of said source of potential and the cathode of said second vacuum tube.

13. An electronic circuit for converting a signal characterized by the presence or absence of current in a two terminal loop to a signal characterized by the polarity of current comprising an oscillator having an output transformer, said transformer having at least one output winding, means for coupling the input of said oscillator to said two terminal loop, a rectifier having first and second terminals, means for connecting one terminal of said rectifier to one end of said output winding, a first resistor connecting the other end of said output winding to the other terminal of said rectifier, a capacitor connected in parallel with said first resistor, first and second transistors each having an emitter, a collector and a base, said transistors being complementary, a second resistor connecting the emitters of said first and second transistors, a first source of potential having first, second and third terminals at different voltages with the voltage of said second terminal intermediate the voltages of said first and third terminals, means for connecting the first terminal of said first source of potential to the collector of said first transistor, a third resistor connecting the third terminal of said first source of potential to the collector of said second transistor, means for connecting the base of said first transistor to the other terminal of said rectifier, means for connecting the emitter of said first transistor to the other end of said output winding, a second source of potential connecting the emitter of said first transistor to the base of said second transistor, and means for connecting a load between the emitter of said second transistor and the second terminal of said first source of potential.

14. An electronic circuit for converting a signal characterized by the presence or absence of current in a two terminal loop to a signal characterized by the polarity of current comprising a signal amplifying means having input, output and cathode terminals, a transformer having first, second and third windings, a first resistor connected across the terminals of said two terminal loop, means for connecting said first winding between the output terminal of said signal amplifying means and one terminal of said two terminal loop, means for connecting one end of said second winding to said other terminal of said two terminal loop and to the reference terminal of said signal amplifying means, means for connecting the other end of said second winding to the input terminal of said signal amplifying means, a rectifier having first and second terminals, means for connecting one terminal of said rectifier to one end of said third winding, a second resistor connecting the other end of said third winding to the other terminal of said rectifier, a capacitor connected in parallel with said second resistor, first and second transistors each having an emitter, a collector and a base, said transistors being complementary, a third resistor connecting the emitters of said first and second transistors, a first source of potential having first, second and third terminals at different voltages with the voltage of said second terminal intermediate the voltages of said first and third terminals, means for connecting the first terminal of said first source of potential to the collector of said first transistor, a fourth resistor connecting the third terminal of said first source of potential to the said second transistor, means for connecting the base of said first transistor to the other terminal of said rectifier, means for connecting the emitter of said first transistor to the other end of said third winding, a second source of potential connecting the emitter of said first transistor to the base of said second transistor, and means for connecting a load between the emitter of said second transistor and the second terminal of said first source of potential.

15. An electronic circuit for converting a signal characterized by the presence or absence of current in a two terminal loop to a signal characterized by the polarity of current comprising a first transistor having an emitter, a collector and a base, a transformer having first, second and third windings, a first resistor connected across the terminals of said two terminal loop, means for connecting said first winding between the collector of said first transistor and one terminal of said two terminal loop, means for connecting one end of said second winding to said other terminal of said two terminal loop and to the emitter of said first transistor, resistive means connecting the other end of said second winding to the base of said first transistor and to said one terminal of said two terminal loop, a rectifier having first and second terminals, means for connecting one terminal of said rectifier to one end of said third winding, a second resistor connecting the other end of said third winding to the other terminal of said rectifier, a capacitor connected in parallel with said second resistor, second and third transistors each having an emitter, a collector and a base, said transistors being complementary, a third resistor connecting the emitters of said second and third transistors, a first source of potential having first, second and third terminals at different voltages with the voltage of said second terminal intermediate the voltages of said first and third terminals, means for connecting the first terminal of said first source of potential to the collector of said second transistor, a fourth resistor connecting the third terminal of said first source of potential to the collector of said third transistor, means for connecting the base of said second transistor to the other terminal of said rectifier, means for connecting the emitter of said second transistor to the other end of said third winding, a second source of potential connecting the emitter of said second transistor to the base of said third transistor, and means for connecting a load between the emitter of said third transistor and the second terminal of said first source of potential.

References Cited in the file of this patent

UNITED STATES PATENTS 2,801,283 Beaufoy ---------------- July 30, 1957